(12) United States Patent
Li et al.

(10) Patent No.: US 11,975,741 B2
(45) Date of Patent: May 7, 2024

(54) AUTOMATED GUIDED VEHICLE CONTROL SYSTEM AND CONTROL METHOD THEREOF

(71) Applicant: TECO Electric & Machinery Co., Ltd., Taipei (TW)

(72) Inventors: Yi-Ting Li, Taipei (TW); Cheng-Yun Chung, Taipei (TW)

(73) Assignee: TECO ELECTRIC & MACHINERY CO., LTD., Taipei (TW)

( * ) Notice: Subject to any disclaimer, the term of this patent is extended or adjusted under 35 U.S.C. 154(b) by 458 days.

(21) Appl. No.: 17/392,977

(22) Filed: Aug. 3, 2021

(65) Prior Publication Data

US 2022/0097735 A1    Mar. 31, 2022

(30) Foreign Application Priority Data

Sep. 25, 2020   (TW) ................... 109133297
Dec. 11, 2020   (TW) ................... 109143857
Dec. 16, 2020   (TW) ................... 109144550

(51) Int. Cl.
*B60W 10/00*    (2006.01)
*B60W 50/00*    (2006.01)
(Continued)

(52) U.S. Cl.
CPC .. *B60W 60/00256* (2020.02); *B60W 50/0097* (2013.01); *G01C 21/206* (2013.01);
(Continued)

(58) Field of Classification Search
CPC ....... B60W 60/00256; B60W 50/0097; B60W 2556/10; B60W 10/00; G01C 21/206; G01C 21/005; G06Q 10/06315; G06Q 10/087; G06Q 20/201; G06Q 20/208; G06Q 30/0202; G06Q 30/0617; G06Q 20/202; G06Q 20/203; G06Q 20/206;
(Continued)

(56) References Cited

U.S. PATENT DOCUMENTS 6,435,407 B1* 8/2002 Fiordelisi ............. B62B 3/1428
                                                    235/431
2017/0003682 A1* 1/2017 Segman ............... B62B 5/0033
(Continued)

*Primary Examiner* — Shardul D Patel
(74) *Attorney, Agent, or Firm* — MUNCY, GEISSLER, OLDS & LOWE, P.C.

(57) ABSTRACT

An automated guided vehicle control system includes a commodity database, a historical shopping information acquisition module, a purchase-item prediction module, an automated guided vehicle database, an automated guided vehicle dispatch demand assessment module and an automated guided vehicle dispatch module. The historical shopping information acquisition module is utilized to retrieve the historical shopping information related to the customer, further to locate the instant predicted commodity to be purchased, and thereby to dispatch the suitable automated guided vehicle to the waiting area of the customer. Further, the historical shopping information is evaluated to provide the commodity type options for the customer to select, to locate the commodity type to be purchased, and thereby to organize the automated navigation path for the automated guided vehicle to travel along to reach the assigned commodity display area.

10 Claims, 14 Drawing Sheets

(51) Int. Cl.
*B60W 60/00* (2020.01)
*G01C 21/20* (2006.01)
*G06Q 10/0631* (2023.01)
*G06Q 10/087* (2023.01)
*G06Q 20/20* (2012.01)
*G06Q 30/0202* (2023.01)
*G06Q 30/0601* (2023.01)
*G07C 9/00* (2020.01)

(52) U.S. Cl.
CPC ..... *G06Q 10/06315* (2013.01); *G06Q 10/087* (2013.01); *G06Q 20/201* (2013.01); *G06Q 20/208* (2013.01); *G06Q 30/0202* (2013.01); *G06Q 30/0617* (2013.01); *G07C 9/00* (2013.01); *B60W 2556/10* (2020.02)

(58) Field of Classification Search
CPC .... G06Q 20/4015; G07C 9/00; G07G 1/0081; G07G 1/14
USPC .......................................................... 701/25
See application file for complete search history.

(56) References Cited

U.S. PATENT DOCUMENTS

| | | | |
|---|---|---|---|
| 2018/0057034 A1* | 3/2018 | Deshpande | B62B 5/002 |
| 2018/0282075 A1* | 10/2018 | Allen | G05B 19/41895 |
| 2019/0187698 A1* | 6/2019 | Jacquemart | G05D 1/0027 |
| 2021/0004023 A1* | 1/2021 | Wakayama | G08G 1/166 |
| 2021/0125264 A1* | 4/2021 | Song | G06Q 30/0639 |

* cited by examiner

AUTOMATED GUIDED VEHICLE CONTROL SYSTEM AND CONTROL METHOD THEREOF

This application claims the benefit of three Taiwan Patent Applications: (1) Serial No. 109133297, filed Sep. 25, 2020; (2) Serial No. 109143857, filed Dec. 11, 2020; and, (3) Serial No. 109144550, filed Dec. 16, 2020; the subject matter of which is incorporated herein by reference.

BACKGROUND OF THE INVENTION

(1) Field of the Invention

The invention relates to an automated guided vehicle control system and control method, and more particularly to an automated guided vehicle control system and associated control method that can dispatch a relevant automated guided vehicle to a customer to meet his or her consumption habits.

(2) Description of the Prior Art

In existing shopping sites such as supermarkets, hypermarkets or shopping centers, trolleys or baskets are usually provided at the entrance for customers to take, so that the customers can conveniently buy more commodities.

Since the existing trolley or basket can only provide limited capacity, it is quite possible that the purchase amount or items of the user would be limited thereby, or that the user would be easy to find insufficient space in his or her trolley or basket. While the trolley is overloaded, though the user may not be aware of such a situation, yet in fact smooth operation of the trolley around the entire store has been affected. On the other hand, when the basket is filled with commodities, definitely another basket is needed for containing additional purchase. In this circumstance, the user may dispel the desire to continue shopping due to the inconvenience caused by the additional basket.

In addition, most people usually go shopping only for some daily necessities. Empirically, after entering the shopping site, people usually go directly to the area having the necessities they need, such that time staying in the shopping site can be saved. Generally, these necessities include toilet papers, detergents, laundry detergents, shampoos, shower gels, soy sauces, salad oils, seasonings, etc. Since any single purchase of these daily necessities can only be used for a limited period of time, the user may go directly to the specific areas having these daily necessities every time he or she goes shopping at the shopping site. Though, to most of shopping sites, specific commodities including the aforesaid daily necessities are usually displayed in fixed areas, yet the customer to purchase these daily necessities may still go wrong places due to ill memories or differences in purchase items. Obviously, trivial purchasing based on experience would be easy to mesh up the areas displaying specific commodities, and from which, shopping time would be increased, and shopping comfort would be substantially affected, especially for those people who have a crushed schedule.

SUMMARY OF THE INVENTION

In the art, though the shopping site may already provide some trolleys or baskets with larger capacities, yet inconvenience caused by overload or insufficient occupation in using the trolley and basket due to different shopping lists in each shopping may be still a problem to bother the customer. Accordingly, it is an object of the present invention to provide an automated guided vehicle control system and an associated automated guided vehicle control method to help the shopping based on experience with an appropriate shopping vehicle.

In this invention, an automated guided vehicle control system includes a commodity database, a historical shopping information acquisition module, a purchase-item prediction module, an automated guided vehicle database, an automated guided vehicle dispatch demand assessment module and an automated guided vehicle dispatch module.

The commodity database stores a plurality of commodity information according to a plurality of commodity items sold in a shopping site. Each of the plurality of commodity information includes a commodity specification. Each of the plurality of commodity items is corresponding to one of a plurality of commodity types. The historical shopping information acquisition module is configured to retrieve historical shopping information in the shopping site related to a customer upon when the customer enters the shopping site. The historical shopping information records at least one type of historical purchased commodities and at least one purchase date corresponding thereto among the plurality of commodity items purchased by the customer in the shopping site.

The purchase-item prediction module, coupled signally with the commodity database and the historical shopping information acquisition module, is configured to evaluate the at least one type of historical purchased commodities and the at least one purchase date in the historical shopping information and further to predict at least one instant predicted commodity to be purchased among the plurality of commodity items. The purchase-item prediction module further compares the at least one type of historical purchased commodities and the plurality of commodity items to generate at least one instant predicted purchase commodity type corresponding to at least one of the plurality of commodity types. The plurality of automated guided vehicles are disposed in the shopping site, and each of the plurality of automated guided vehicles has a navigation module. The automated guided vehicle database stores a plurality of vehicle specification information corresponding to the plurality of automated guided vehicles, and each of the plurality of vehicle specification information includes a maximum vehicle carrying capacity.

The automated guided vehicle dispatch demand assessment module, coupled signally with the purchase-item prediction module and the automated guided vehicle database, is configured to compare the commodity specification corresponding to the at least one instant predicted commodity to be purchased and the maximum vehicle carrying capacity of each of the plurality of automated guided vehicles so as to locate one of the plurality of automated guided vehicles as a suitable automated guided vehicle to carry the at least one instant predicted commodity to be purchased and then to issue an automated guided vehicle dispatch demand signal to ask for dispatching the suitable automated guided vehicle. The automated guided vehicle dispatch module, coupled signally with the automated guided vehicle dispatch demand assessment module, is configured to receive and evaluate the automated guided vehicle dispatch demand signal and further to issue a dispatch signal to the suitable automated guided vehicle to move the suitable automated guided vehicle to a waiting area of the customer.

The shopping-site map database stores map data corresponding to the shopping site, and the map data is divided into a plurality of commodity display areas according to the plurality of commodity types.

The operation interface, coupled signally with the purchase-item prediction module, is configured to evaluate the plurality of instant predicted purchase commodity types to provide a plurality of commodity type options for the customer to select, and to transmit a specified commodity-type signal upon when the customer determines an assigned commodity type option from the plurality of commodity type options.

The vehicle navigation module, coupled signally with the operation interface, the shopping-site map database and the plurality of automated guided vehicles, is configured to evaluate the specified commodity-type signal to determine an assigned commodity display area corresponding to the assigned commodity type option from the plurality of commodity display areas, and thereby to generate an automated navigation path for the automated guided vehicle to travel therealong to reach the assigned commodity display area.

In this invention, an automated guided vehicle control method includes Step (A) to Step (H) as follows. In Step (A), a sensor module is utilized to detect if or not an identification device enters a shopping site, and to generate a consumer entry signal to a historical shopping information acquisition module upon when the identification device is detected to enter the shopping site. In Step (B), according to the consumer entry signal, the historical shopping information acquisition module retrieves historical shopping information related to a customer in the shopping site, and then transmits the historical shopping information to a purchase-item prediction module. The historical shopping information records at least one type of historical purchased commodities among a plurality of commodity items the customer ever purchased in the shopping site and a plurality of purchase dates whenever the at least one type of historical purchased commodities is purchased.

In Step (C), the purchase-item prediction module evaluates the at least one type of historical purchased commodities and the plurality of purchase dates in the historical shopping information to predict at least one instant predicted commodity to be purchased among the plurality of commodity items for the customer. In Step (D), an automated guided vehicle dispatch demand assessment module is utilized to compare a commodity specification of the at least one instant predicted commodity to be purchased with maximum vehicle carrying capacities corresponding to the plurality of automated guided vehicles, to determine a suitable automated guided vehicle for carrying the at least one instant predicted commodity to be purchased, and thereby to issue an automated guided vehicle dispatch demand signal to request the suitable automated guided vehicle.

In Step (E), an automated guided vehicle dispatch module is utilized to receive and evaluate the automated guided vehicle dispatch demand signal to dispatch the suitable automated guided vehicle to a waiting area of the customer.

In Step (F), according to the historical shopping information, a plurality of preferable options of commodities are provided for the customer to determine one target commodity therefrom.

In Step (G), according to the target commodity, an automated navigation path is planned. In Step (H), the suitable automated guided vehicle is controlled to move along the automated navigation path to reach one of a plurality of commodity display areas corresponding to the target commodity.

As stated, the automated guided vehicle control system and the associated automated guided vehicle dispatch method provided by this invention mainly utilize the historical shopping information acquisition module to retrieve the historical shopping information related to the customer, further to locate the instant predicted commodity to be purchased, and thereby to dispatch the suitable automated guided vehicle to the waiting area of the customer, such that the customer can be provided with the automated guided vehicle meeting the purchase habit of the customer. In addition, since the present invention can evaluate the historical shopping information to provide the commodity type options for the customer to select, further to locate the commodity type to be purchased, and thereby to organize the automated navigation path for the automated guided vehicle to travel along to reach the assigned commodity display area, such that the customer can be well guided during the shopping, and the usage convenience of the load vehicle can be substantially enhanced.

All these objects are achieved by the automated guided vehicle control system and the control method thereof described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to an automated guided vehicle control system and a control method thereof. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
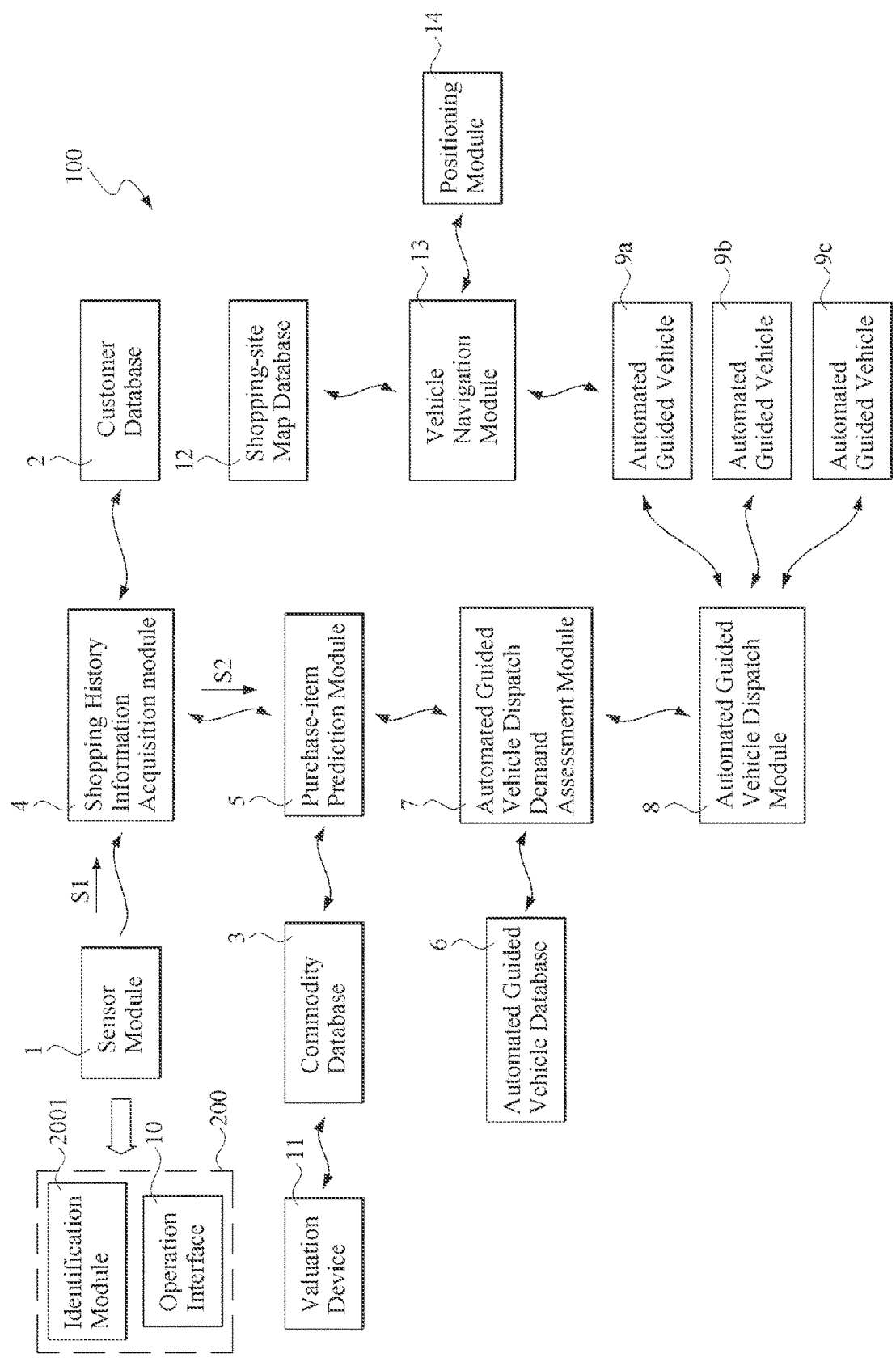
FIG. 1 is a schematic block view of a preferred embodiment of the automated guided vehicle control system in accordance with the present invention.
Figure 2A:
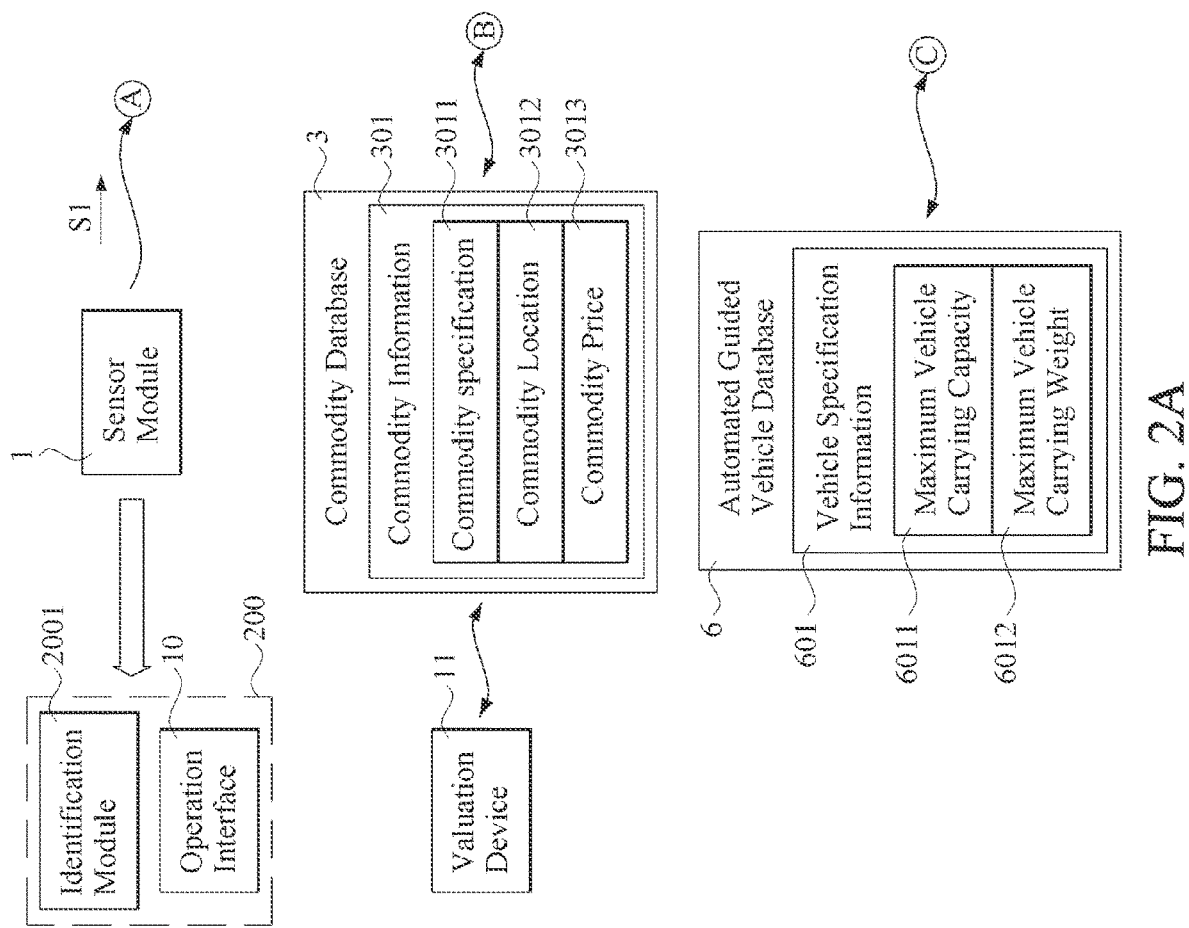
FIG. 2A and FIG. 2B are together to show schematically part of FIG. 1 in details.
Figure 2B:
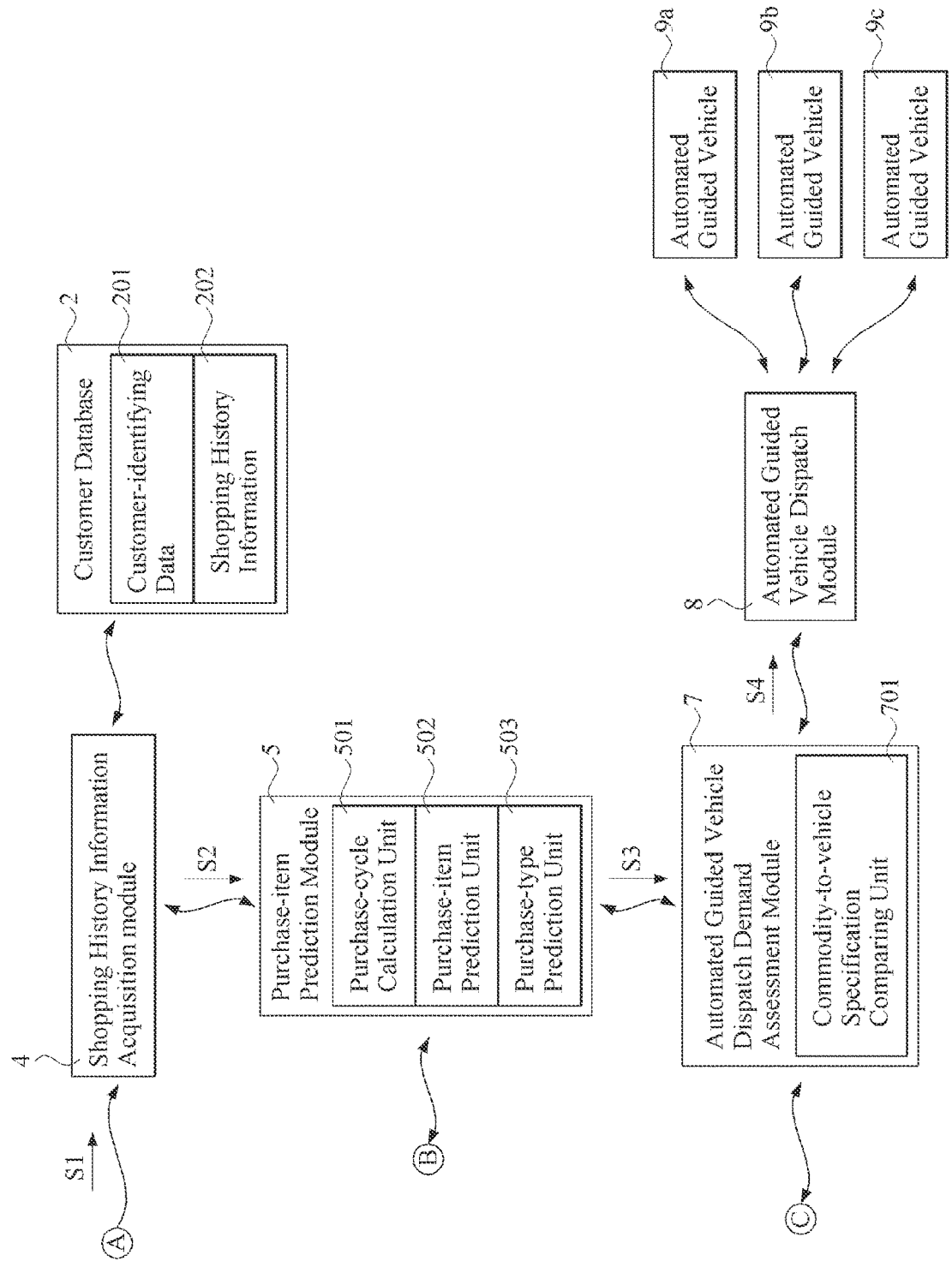
Figure 3:
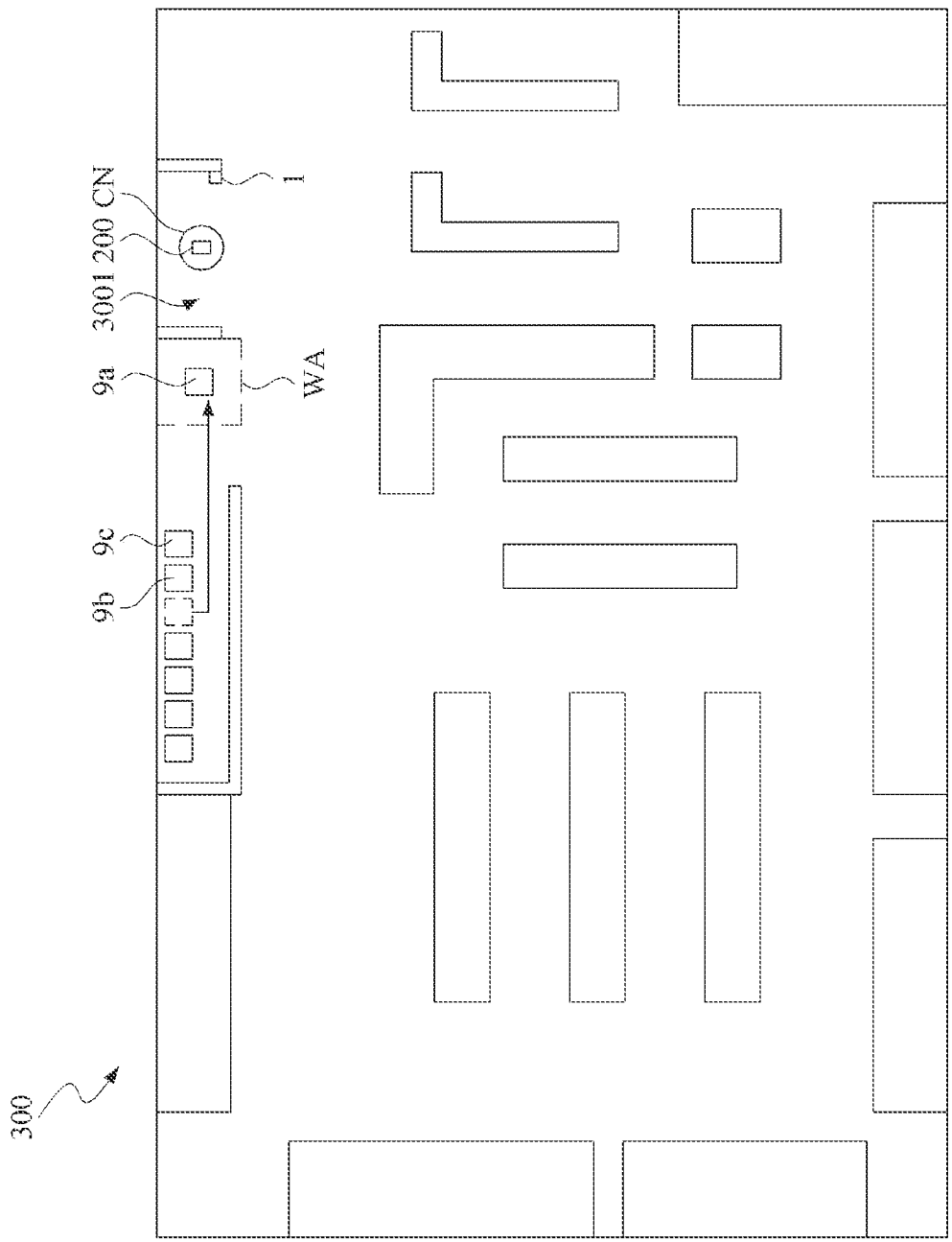
FIG. 3 demonstrates schematically a surface arrangement for the automated guided vehicle control system of FIG. 1.

Refer to FIG. 1 through FIG. 3; where FIG. 1 is a schematic block view of a preferred embodiment of the automated guided vehicle control system in accordance with the present invention, FIG. 2A and FIG. 2B are together to show schematically part of FIG. 1 in details, and FIG. 3 demonstrates schematically a surface arrangement for the automated guided vehicle control system of FIG. 1.

As shown in FIG. 1 to FIG. 3, an automated guided vehicle control system 100 includes a sensor module 1, a customer database 2, a commodity database 3, a historical shopping information acquisition module 4, a purchase-item prediction module 5, an automated guided vehicle database 6, an automated guided vehicle dispatch demand assessment module 7, an automated guided vehicle dispatch module 8, a plurality of automated guided vehicles 9a, 9b and 9c (three shown in the figure), an operation interface 10, an valuation device 11, a shopping-site map database 12, a vehicle navigation module 13 and a positioning module 14.

The sensor module 1 is configured to detect an identification device 200 carried by a customer CN, and accordingly to generate a corresponding consumer entry signal S1 if the customer CN is detected to enter a shopping site 300. The sensor module 1, disposed at an entrance 3001 of the shopping site 300, such that the identification device 200 can be detected while the customer CN passes through the entrance 3001. In addition, the identification device 200 has an identification module 2001. While the sensor module 1 is interacting with the identification module 2001 for processing wireless sensing identification, identification information standing for the customer CN would be read. The identification information can be a mobile phone identification code or number the personal identification number, a membership number, or any realized information that can be used for identifying the customer CN. The identification information is then transmitted as a consumer entry signal S1.

As described, in this embodiment, the sensor module 1 can be an RFID detector or an NFC detector, the identification device 200 can be a smart phone or a wearable electronic device, and the identification module 2001 can be an RFID module or an NFC module.

The customer database 2 includes customer-identifying data 201 and historical shopping information 202. The customer-identifying data 201 and the historical shopping information 202 are both in correspondence to the customers CN. In this embodiment, the customer-identifying data 201 include customer names or customer codes, while the historical shopping information 202 includes a plurality of historical purchased commodities (not shown in the figure) corresponding to the customer-identifying data 201 and a plurality of purchase dates (not shown in the figure) corresponding to the historical purchased commodities. Practically, the historical purchased commodities and the corresponding purchase dates can be records abstracted from historical purchase records of the customers CN. For example, the records can show that the customer CN purchased a whole box of nuts-mixed flavors of specific brand on each date of 14 May, 16 June, 15 July, 13 August and 15 September.

The commodity database 3 stores a plurality of commodity information 301 (one labeled in the figure) in correspondence to a plurality of commodity items purchased from the shopping site 300. Each of the commodity information 301 includes a commodity specification 3011, a commodity location 3012 and a commodity price 3013. In particular, the commodity specification 3011 includes a commodity size or a commodity weight (not shown in the figure).

In this embodiment, the commodity item mainly includes a commodity name, further furnished optionally with at least a brand or a type of the commodity such as nuts-mixed flavors of specific brand. Based on the commodity items, the commodity specification 3011 includes at least a commodity size or a commodity weight. To those small-package commodities, since their volumes are comparatively small, thus some of them are labeled by commodity weights. On the other hand, to those large-package commodities, since their volumes are comparatively big, thus some of them would be labeled by commodity sizes. For example, the commodity size of dining chair would be labeled as 60×63×90 cm. However, if a commodity has a large size and also a large weight, then it might be labeled by both the commodity size and the commodity weight. For example, for an entire box of the specific-brand nuts-mixed flavors, the commodity size and the commodity weight may be labeled as 200×80×90 mm/20 kg.

The historical shopping information acquisition module 4, coupled signally with the sensor module 1 and the customer database 2, is configured to receive the consumer entry signal S1 from the sensor module 1, in which the customer entry signal S1 tells the entrance of the customer CN into the shopping site 300. According to identification information from the consumer entry signal S1, the historical shopping information 202 related to the customer CN in the shopping site 300 would be retrieved from the customer database 2. The historical shopping information 202 would be then transmitted as a shopping history signal S2.

The purchase-item prediction module 5, coupled signally with the commodity database 3 and the historical shopping information acquisition module 4, is configured to receive the shopping history signal S2. In this embodiment, the purchase-item prediction module 5 includes a purchase-cycle calculation unit 501, a purchase-item prediction unit 502 and a purchase-type prediction unit 503. The purchase-cycle calculation unit 501 evaluates a plurality of purchase dates of the historical shopping information 202 corresponding to the historical purchased commodities to calculate a plurality of purchase cycles corresponding to the historical purchased commodities. For example, since the historical shopping information acquisition module 4 would transmit the historical shopping information 202 retrieved from the customer database 2 to the purchase-item prediction module 5, thus the purchase-cycle calculation unit 501 would understand that the customer CN purchased a whole box of nuts-mixed flavors of a specific brand on each date of 14 May, 16 June, 15 July, 13 August and 15 September, and then would derive the purchase cycle for the customer CN to purchase an entire box of nuts-mixed flavors of the specific brand is once per month, and at the date around 15 of the month.

The purchase-item prediction unit 502, furnished with a date table (not shown in the figure), would evaluate the date table, the purchase cycle and the instant purchase date when the customer CN enters the shopping site 300, to predict at least one instant predicted commodity to be purchased by the customer CN among the plurality of commodity items. In this embodiment, since the purchase-cycle calculation unit 501 can calculate the purchase cycle for the customer CN to purchase an entire box of nuts-mixed flavors of the specific brand is once per month, and at the date around 15 of the month, thus it will be determined that the instant predicted commodity to be purchased would be an entire box of nuts-mixed flavors of the specific brand upon when the purchase-item prediction unit 502 verifies that the instant purchase date of the customer CN in the shopping site 300 is around 15 of the month. After the purchase-item prediction unit 502 determines the instant predicted commodity to be purchased, then the instant predicted commodity to be purchased would be transmitted as an estimated commodity signal S3.

The purchase-type prediction unit 503 compares the historical shopping information 202 carried by the shopping history signal S2 to both the historical purchased commodities and the commodity items so as to generate a plurality of instant predicted purchase commodity types among all the commodity types. In this embodiment, the purchase-type prediction unit 503 can evaluate the purchase dates contained in the historical shopping information 202 related to the shopping of the customer CN in the shopping site 300 to judge the purchase frequency of each of the historical purchased commodities, and then refer to the instant date for determining one of the historical purchased commodities that matches the instant predicted purchase commodity types.

The automated guided vehicle database 6 stores a plurality of vehicle specification information 601 (one shown in the figure), and each of vehicle specification information 601 has a maximum vehicle carrying capacity. The maximum vehicle carrying capacity includes a maximum vehicle carrying capacity 6011 and a maximum vehicle carrying weight 6012.

The automated guided vehicle dispatch demand assessment module 7, coupled signally with the purchase-item prediction module 5 and the automated guided vehicle database 6, is configured to receive the estimated commodity signal S3. The automated guided vehicle dispatch demand assessment module 7 has a commodity-to-vehicle specification comparing unit 701 used for comparing the commodity specification 3011 (including a commodity size or/and a commodity weight) corresponding to the instant predicted commodity to be purchased with the maximum vehicle carrying capacity 6011 or/and the maximum vehicle carrying weight 6012, so as to recommend a suitable automated guided vehicle relevant for carrying the instant predicted commodity to be purchased, and thereby to issue an automated guided vehicle dispatch demand signal S4 if dispatching a suitable automated guided vehicle is required.

In this embodiment, for example, since the instant predicted commodity to be purchased is an entire box of nuts-mixed flavors of the specific brand, thus the commodity-to-vehicle specification comparing unit 701 would evaluate the commodity size and the commodity weight corresponding to the instant predicted commodity to be purchased to determine whose maximum vehicle carrying capacity 6011 and maximum vehicle carrying weight 6012 of the automated guided vehicle 9a, 9b or 9c can satisfy the commodity size and weight of 200×80×90 mm/20 kg. In this example, since the entire box of nuts-mixed flavors of the specific brand has a bigger size and a heavier weight, thus the commodity-to-vehicle specification comparing unit 701 would choose the automated guided vehicle 9a who has a larger maximum vehicle carrying capacity 6011 and a heavier maximum vehicle carrying weight 6012 as a suitable automated guided vehicle to carry the instant predicted commodity to be purchased.

The automated guided vehicle dispatch module 8, coupled signally with the automated guided vehicle dispatch demand assessment module 7, is configured to receive and evaluate the automated guided vehicle dispatch demand signal S4 to dispatch a suitable automated guided vehicle to a waiting area WA where the customer CN is disposed.

Each of the plurality of automated guided vehicles (9a, 9b and 9c, three shown in the figure) is coupled signally with the automated guided vehicle dispatch module 8, and the vehicle specification information 601 corresponding to the automated guided vehicles 9a, 9b and 9c are all different. In this embodiment, the vehicle specification information 601 corresponding to the automated guided vehicle 9a is labeled by the maximum vehicle carrying capacity 6011, the vehicle specification information 601 corresponding to the automated guided vehicle 9b is labeled by the maximum vehicle carrying weight 6012, and the vehicle specification information 601 corresponding to the automated guided vehicle 9c is labeled by both the maximum vehicle carrying capacity 6011 and the maximum vehicle carrying weight 6012. Further, in detail, the automated guided vehicles 9a, 9b and 9c stand for the types of the automated guided vehicles representing high carrying capacity, high carrying weight, and both high carrying capacity and high carrying weight, respectively. However, the present invention is not limited thereto. Practically, types of the automated guided vehicles can be further divided into more different or finer carrying capacities and weights.

As described above, the commodity-to-vehicle specification comparing unit 701 is to determine which one of the automated guided vehicles 9a, 9b and 9c is relevant for carrying the instant predicted commodity to be purchased, further to define the choice as the suitable automated guided vehicle, and thereby to issue an automated guided vehicle dispatch demand signal S4 for telling a need in the suitable automated guided vehicle to the automated guided vehicle dispatch module 8, such that the automated guided vehicle dispatch module 8 can dispatch accordingly the suitable automated guided vehicle to the waiting area WA.

Figure 4:
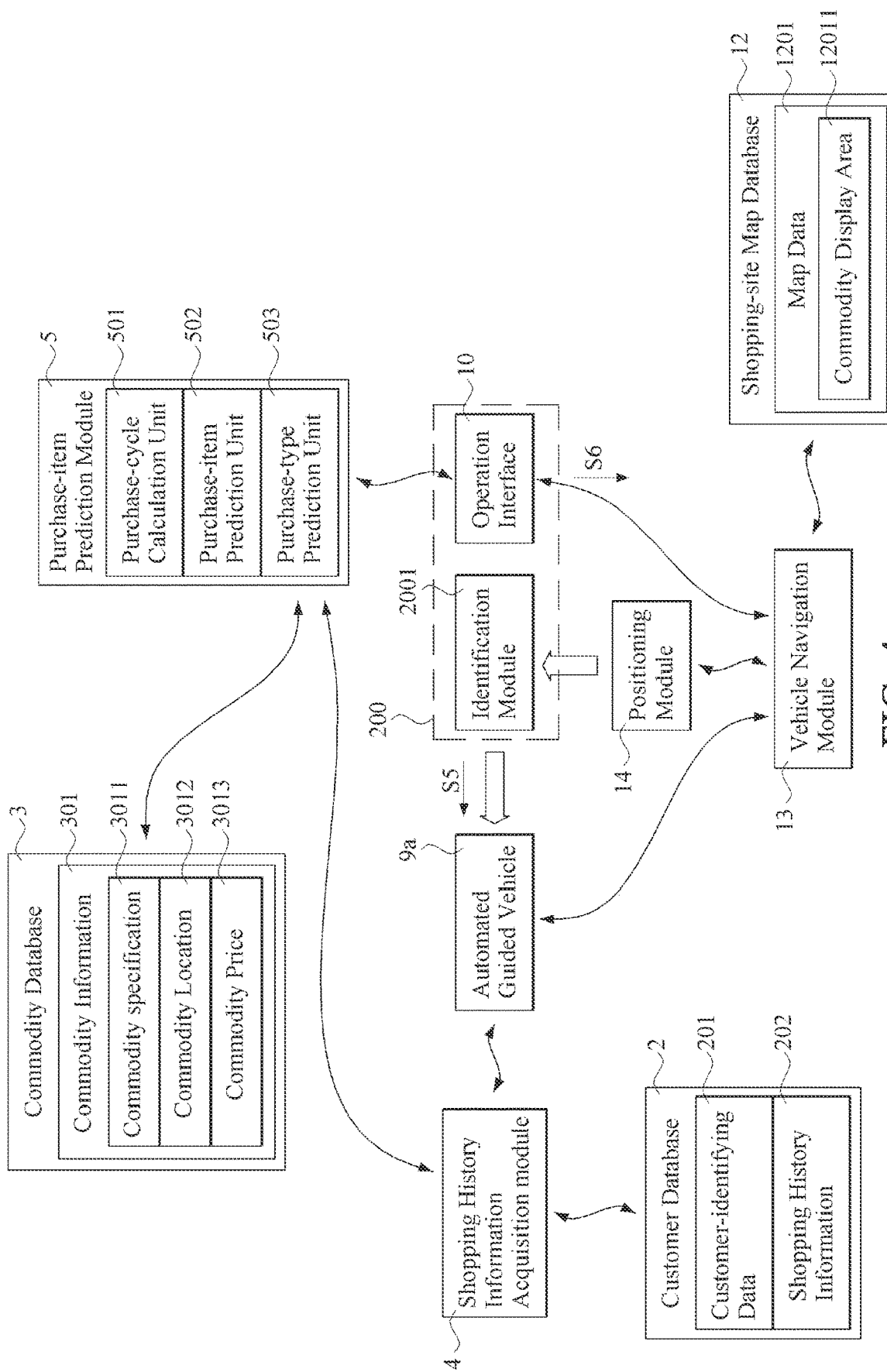
FIG. 4 shows schematically another part of FIG. 1 in details.
Figure 5:
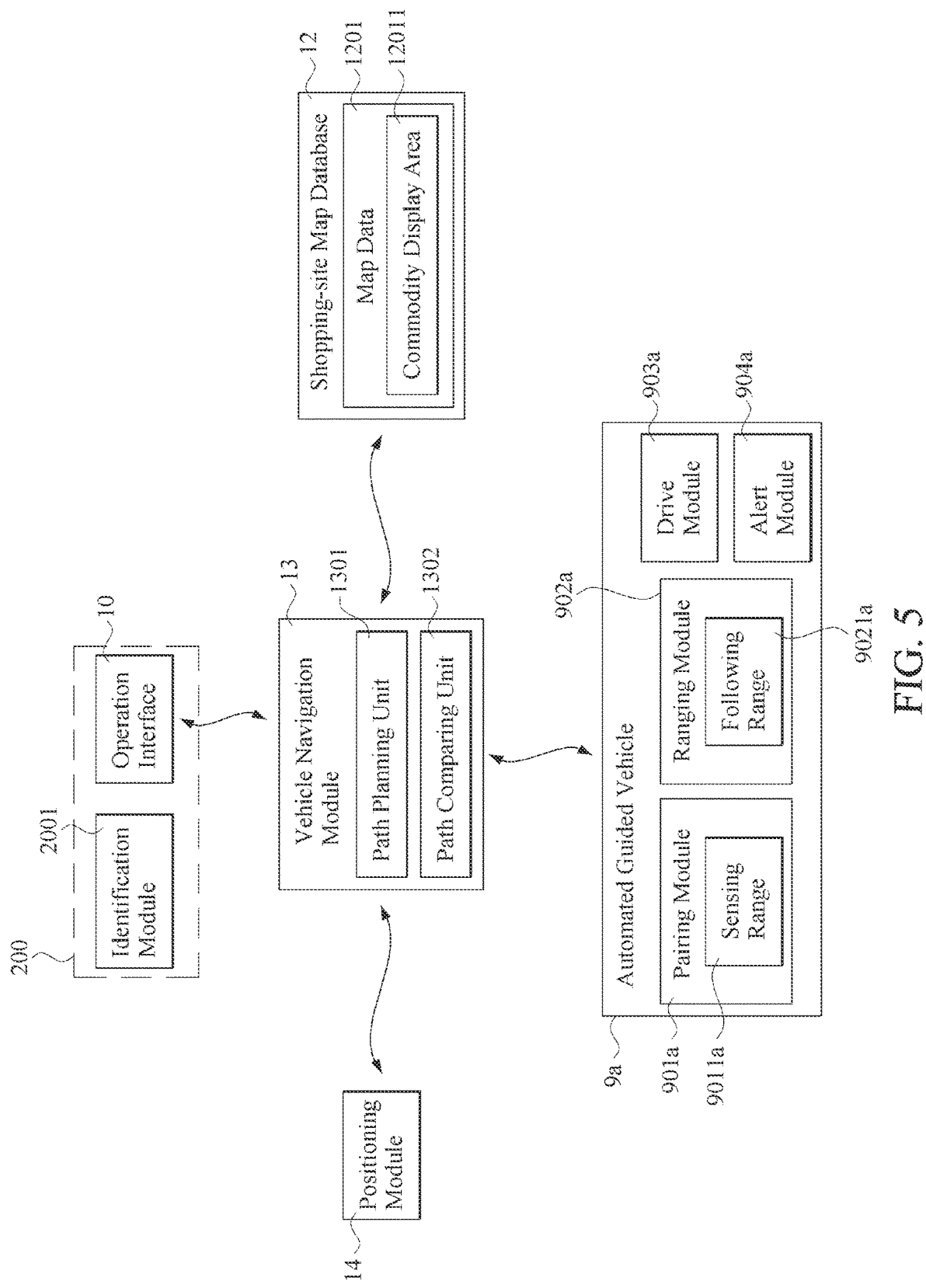
FIG. 5 shows schematically a further part of FIG. 1 in details.

Refer further to FIG. 4 through FIG. 5; where FIG. 4 shows schematically another part of FIG. 1 in details, and FIG. 5 shows schematically a further part of FIG. 1 in details. As shown in FIG. 1 through FIG. 5, after the suitable automated guided vehicle (i.e., the automated guided vehicle 9a) has been dispatched to the waiting area WA, the customer CN can be identified through dialogues between the identification module 2001 of the identification device 200 and the automated guided vehicle 9a, and then a customer-identifying signal S5 would be generated and transmitted to the automated guided vehicle 9a, so that the automated guided vehicle 9a can identify and then bind the identification device 200.

In this embodiment, the operation interface 10 in FIG. 5 is disposed in the identification device 200 and coupled signally with the purchase-item prediction module 5, and provides a plurality of commodity type options for the customer CN to choose according to the instant predicted purchase commodity types provided by the purchase-item prediction module 5. After the customer has determined an assigned commodity type option from the commodity type options, then the operation interface 10 would issue accordingly a specified commodity-type signal S6.

In this embodiment, the purchase-item prediction module 5 would generate a plurality of instant predicted purchase commodity types, such as foods and beauty baths, among all the commodity types, and then the operation interface 10 would display options such as foods and beauty baths for the customer CN to make choice. In addition, in this embodiment, the identification device 200 can be a smart phone, and the operation interface 10 is to provide options displayed on the screen of the smart phone. However, in some other embodiments, the operation interface 10 can be directly disposed at each of the automated guided vehicles 9a, 9b and 9c.

The valuation device 11, coupled signally with the commodity database 3, is disposed at each of the automated guided vehicles 9a, 9b and 9c in this embodiment, and is used for the user to scan commodity codes so as further to obtain the corresponding commodity prices 3013 to be added together to obtain a total price.

The shopping-site map database 12 stores map data 1201 corresponding to the shopping site 300, and the map data 1201 is further divided into a plurality of commodity display areas 12011 (one shown in FIG. 4) in correspondence with a plurality of commodity types.

In this embodiment, the commodity types can include foods, beverage brewing, snacks, beauty bathing, home cleaning or kitchen supplies, etc., and the commodity display area 12011 can be, for example, food area, beverage brewing area, snacks area, beauty bathing area, home cleaning area or kitchen supplies area.

In addition, the commodity locations 3012 of the commodity database 3 are in correspondence to a plurality of commodity items sold in the shopping site 300, each of the commodity items is corresponding to one of the commodity types, and each of the commodity locations 3012 is corresponding to one of the commodity display areas 12011. Practically, the commodity items can include, for example, noodles, pastas, soy sauces, salad oils, whole grains, teas, coffees, juices, beverages, milks, soy drinks, biscuits, sweets, chocolates, shampoos, facial cleansers, body washes, skin care lotions, toilet papers, cleaners or mops, etc. These commodity items corresponding to a plurality of commodity types are displayed in respective commodity display areas 12011.

By having the automated guided vehicle 9a as an example, the vehicle navigation module 13 is configured to navigate the automated guided vehicle 9a in the shopping site 300, and the positioning module 14 is configured to position the identification module 2001 in the shopping site 300, such that the vehicle navigation module 13 can navigate precisely the automated guided vehicle 9a to follow the identification device 200.

Figure 6A:
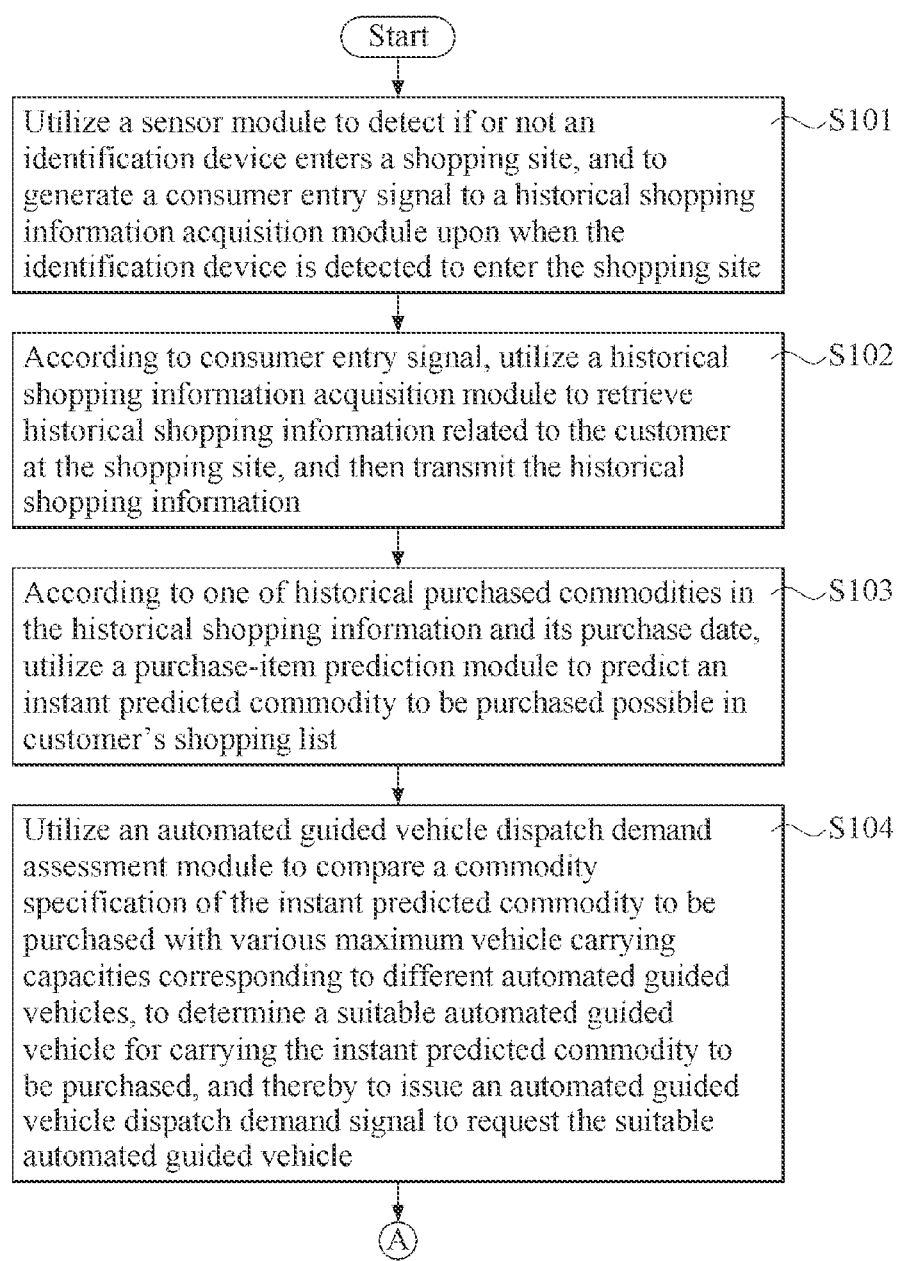
FIG. 6A and FIG. 6B are together to show schematically a flowchart of a preferred embodiment of the automated guided vehicle control method in accordance with the present invention.
Figure 6B:
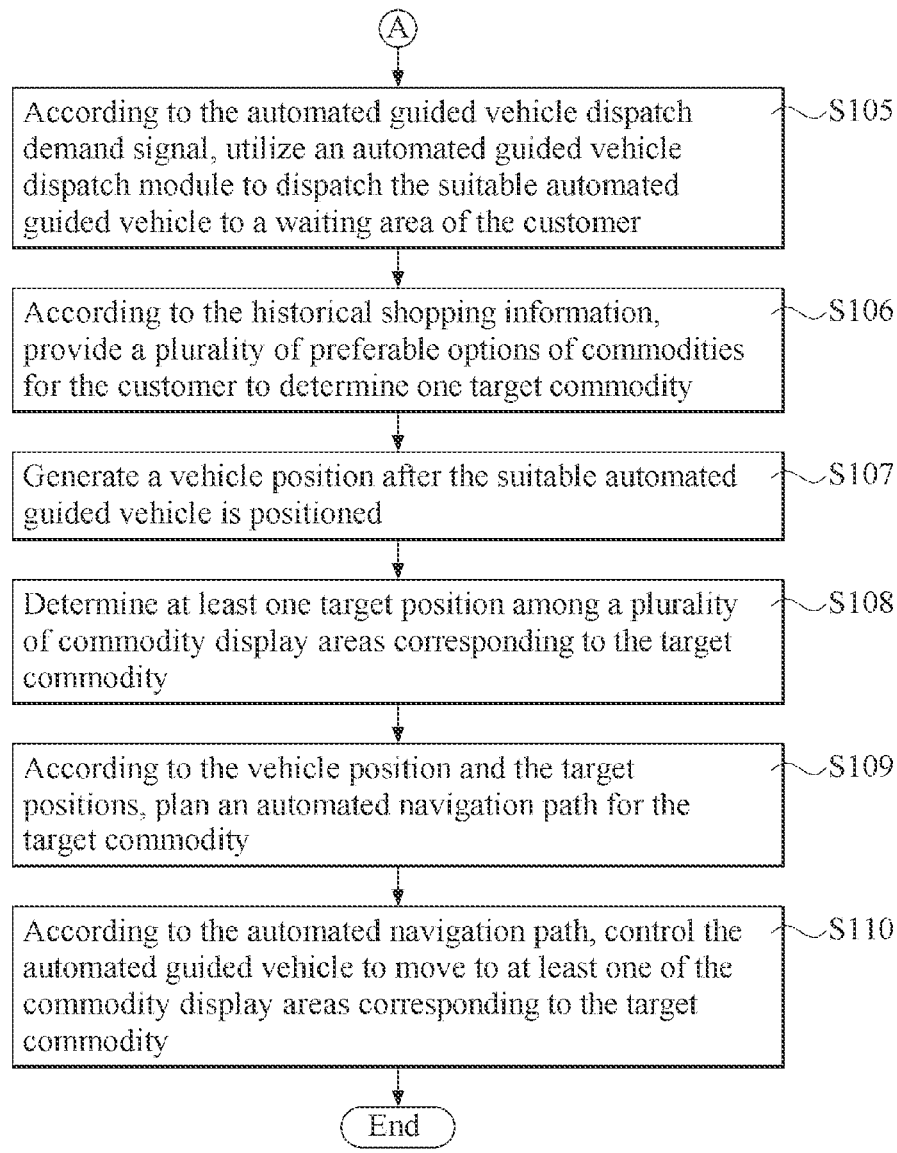
Figure 7:
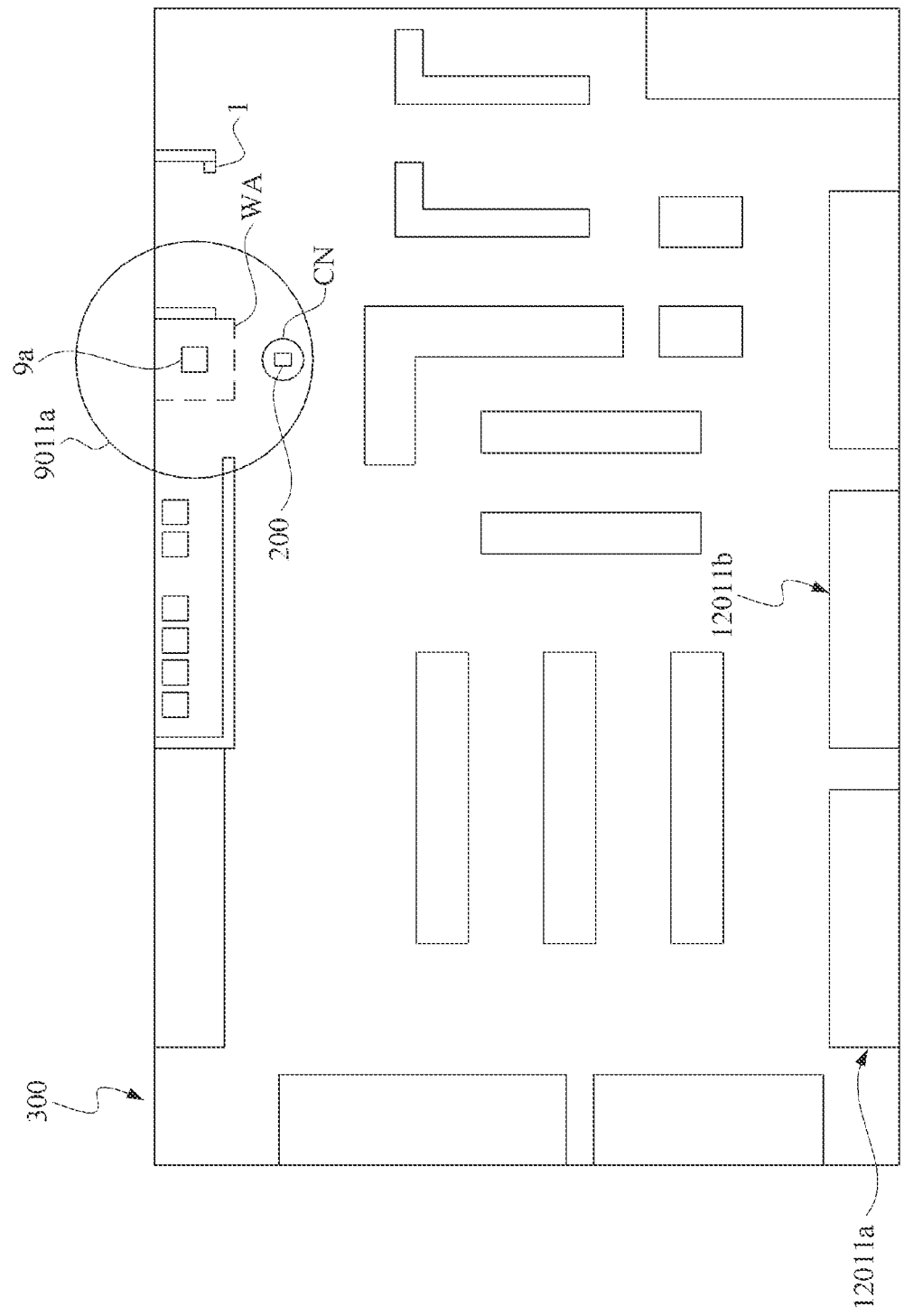
FIG. 7 is a schematic surface view for matching a customer carrying an identification device within a sensing area of an automated guided vehicle in accordance with the present invention.
Figure 8:
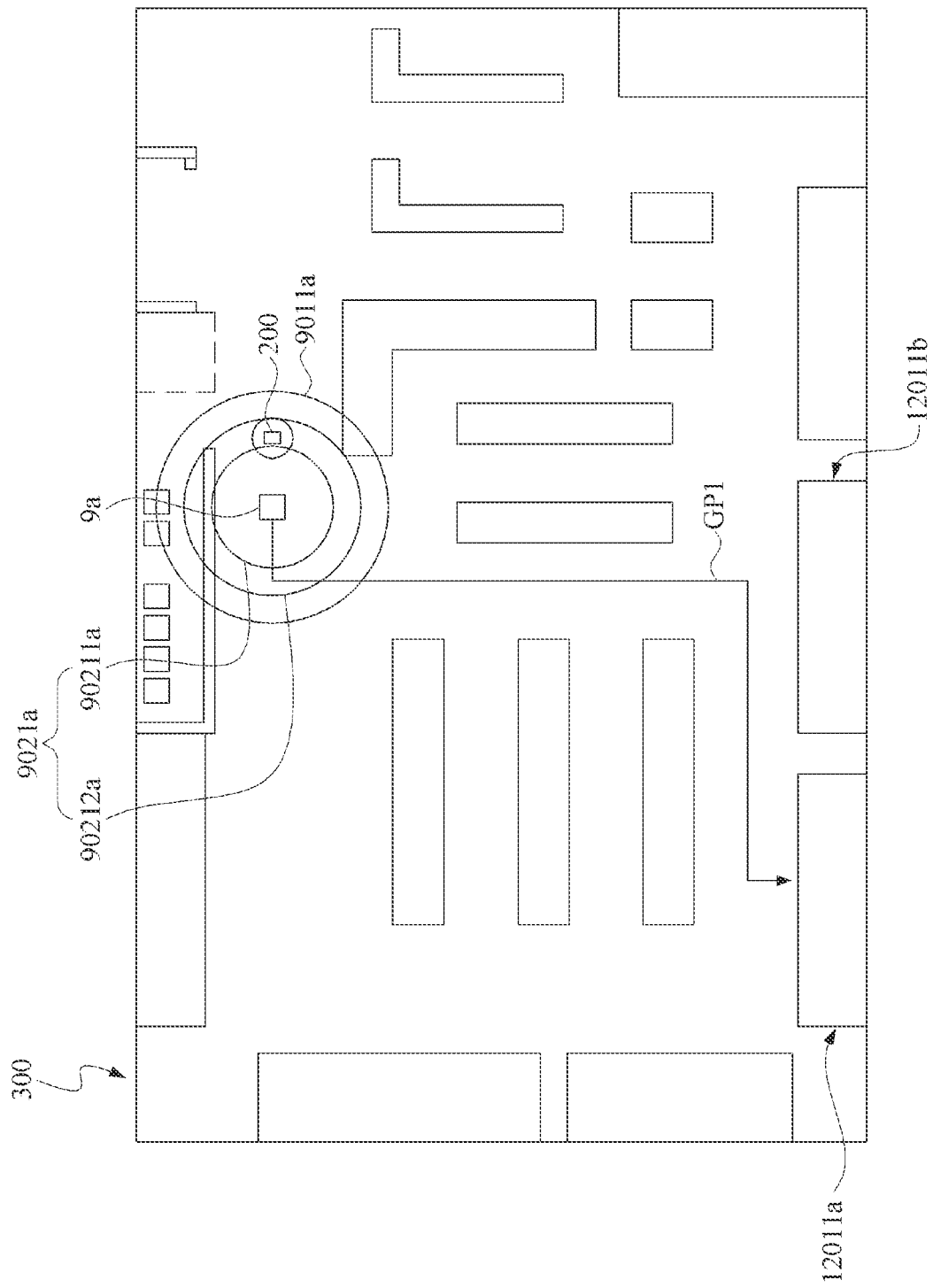
FIG. 8 is a schematic surface view for demonstrating an automated guided vehicle to move toward an assigned commodity display area along an automated navigation path in accordance with the present invention.
Figure 9:
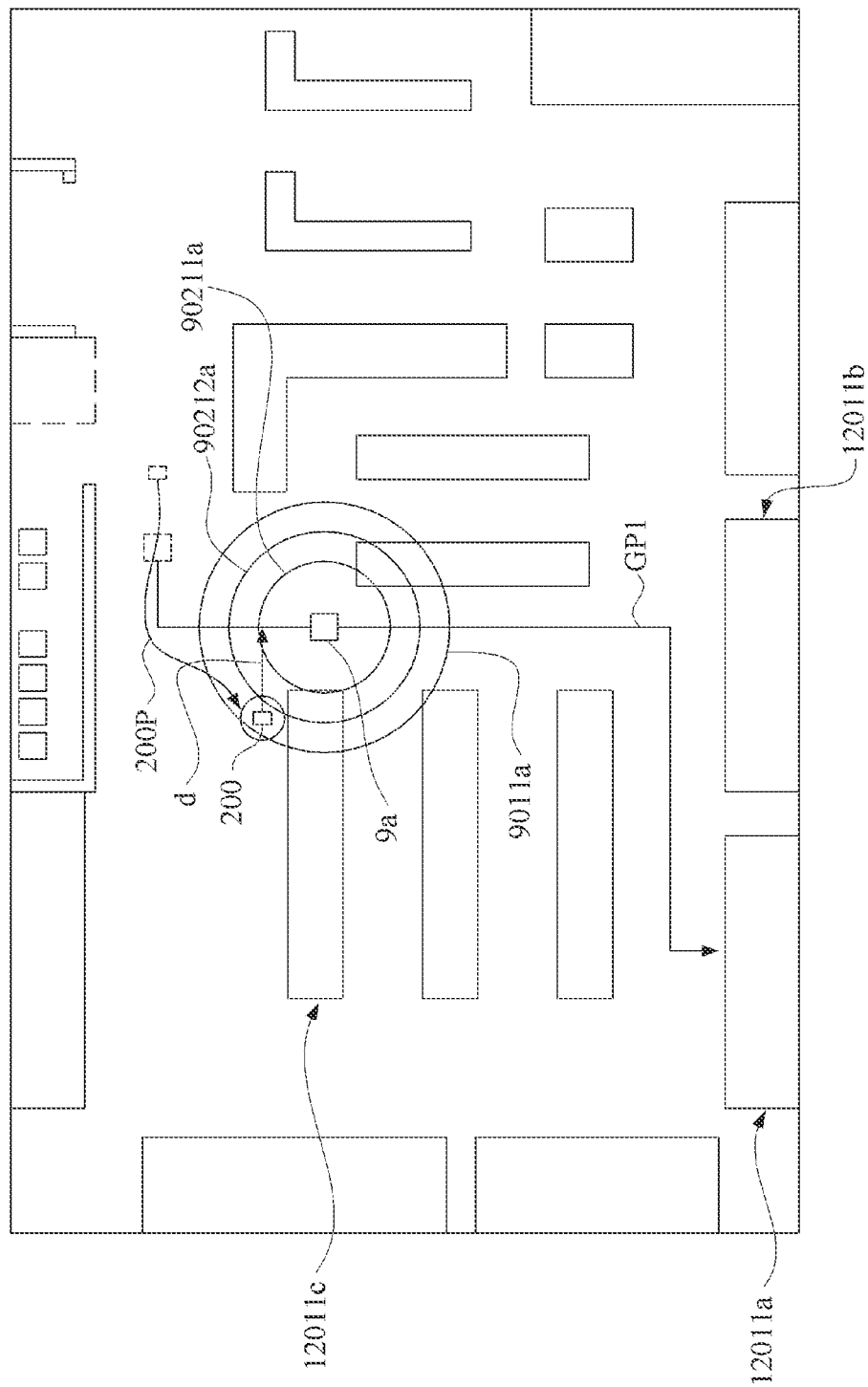
FIG. 9 is a schematic surface view for a situation that a customer carrying an identification device is deviated from an automated navigation path of an automated guided vehicle in accordance with the present invention.
Figure 10:
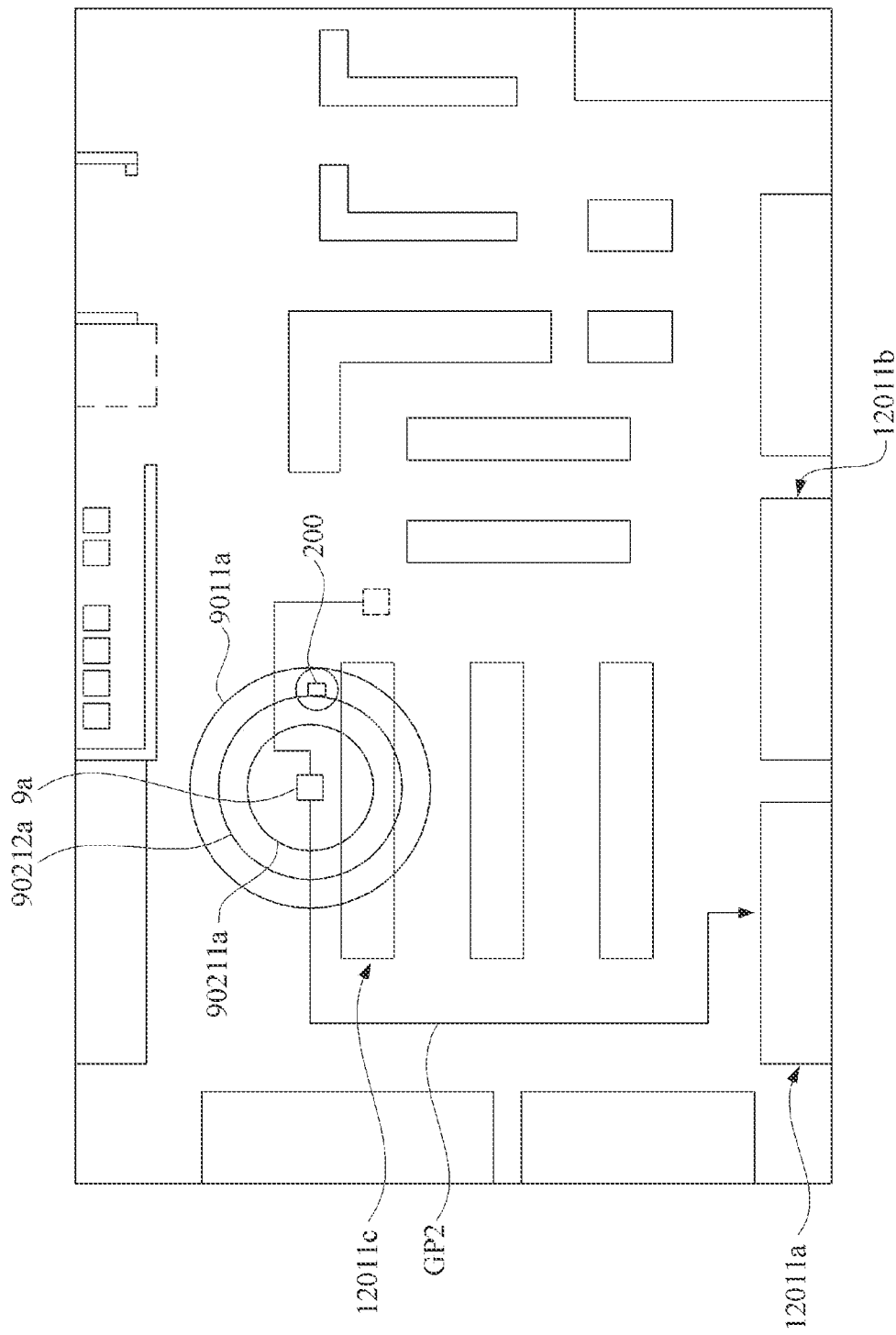
FIG. 10 is a schematic surface view for a situation that an automated guided vehicle moves toward an assigned commodity display area along a replanned automated navigation path in accordance with the present invention.

Refer further to FIG. 6A through FIG. 10; where FIG. 6A and FIG. 6B are together to show schematically a flowchart of a preferred embodiment of the automated guided vehicle control method in accordance with the present invention, FIG. 7 is a schematic surface view for matching a customer carrying an identification device within a sensing area of an automated guided vehicle in accordance with the present invention, FIG. 8 is a schematic surface view for demonstrating an automated guided vehicle to move toward an assigned commodity display area along an automated navigation path in accordance with the present invention, FIG. 9 is a schematic surface view for a situation that a customer carrying an identification device is deviated from an automated navigation path of an automated guided vehicle in accordance with the present invention, and FIG. 10 is a schematic surface view for a situation that an automated guided vehicle moves toward an assigned commodity display area along a replanned automated navigation path in accordance with the present invention.

As shown in FIG. 1 through FIG. 10, by providing the aforesaid automated guided vehicle control system 100, the automated guided vehicle control method includes Step S101 to Step S110 as follows.

In Step S101, the sensor module 1 is utilized to detect if or not the identification device 200 carried by the customer CN enters the shopping site S1, and to generate the consumer entry signal S1 to a historical shopping information acquisition module upon when the identification device 200 is detected to enter the shopping site 300. In Step S102, according to the consumer entry signal S1, the historical shopping information acquisition module 4 is utilized to retrieve the historical shopping information 202 related to the customer CN at the shopping site 300, and then to transmit the historical shopping information 202.

In Step S103, according to one of the historical purchased commodities in the historical shopping information 202 and its purchase date, the purchase-item prediction module 5 is utilized to predict an instant predicted commodity to be purchased possible in the shopping list of the customer CN.

In Step S104, the automated guided vehicle dispatch demand assessment module 7 is utilized to compare the commodity specification 3011 of the instant predicted commodity to be purchased with various maximum vehicle carrying capacities corresponding to different automated guided vehicles 9a, 9b and 9c, to determine a suitable automated guided vehicle for carrying the instant predicted commodity to be purchased, and thereby to issue the automated guided vehicle dispatch demand signal S4 to request the suitable automated guided vehicle. In Step S105, according to the automated guided vehicle dispatch demand signal S4, the automated guided vehicle dispatch module 8 is utilized to dispatch the suitable automated guided vehicle to the waiting area WA of the customer CN.

In Step S106, according to the historical shopping information 202, the plurality of preferable options of commodities are provided for the customer CN to determine one target commodity. Then, in Step S107, the vehicle position is generated after the suitable automated guided vehicle is positioned. Thereafter, in Step S108, at least one target position corresponding to the target commodity is determined from the plurality of commodity display areas 12011. Further, in Step S109, according to the vehicle position and the at least one target position, the automated navigation path GP1 for the target commodity is planned according to the vehicle position and the at least one target position. Finally, in Step S110, according to the automated navigation path GP1, the automated guided vehicle 9a is controlled to move to at least one of the commodity display areas 12011 corresponding to the target commodity.

As described above, further in more detail, the automated guided vehicle 9a is disposed in a vehicle dispatch area (not shown in the figure) of the shopping site 300. In particular, the automated guided vehicle 9a includes a pairing module 901a, a ranging module 902a, a drive module 903a and an alert module 904a.

The pairing module 901a, provided thereinside with a sensing range 9011a, is to pair the identification module 2001 of the identification device 200 and the pairing module 901a upon when the identification device 200 carried by the customer CN enters the sensing range 9011a, and further to have the pairing module 901a to capture the identification information from the identification module 2001. In this embodiment, the sensing range 9011a can have a detection circle with a 5-m radius and centered at the automated guided vehicle 9a. Namely, if the identification module 2001 of the identification device 200 is within the 5-m circle centered at the automated guided vehicle 9a, the pairing module 901a can perform the pairing with the identification module 2001 of the identification device 200.

The ranging module 902a, provided thereinside with a following range 9021a, is configured to detect the position of the identification device 200 carried by the customer CN, and further to determine whether or not the position of the identification device 200 is out of the following range 9021a. As soon as the ranging module 902a determines that the identification device 200 has been out of the following range 9021a, the ranging module 902a would evaluate the distance of the identification device 200 to adjust motions of the automated guided vehicle 9a to have the identification device 200 back within the following range 9021a. In particular, the following range 9021a further includes a first following-range boundary 90211a and a second following-range boundary 90212a.

In this embodiment, the first following-range boundary 90211a is a boundary distanced from the automated guided vehicle 9a by a meter, while the second following-range boundary 90212a can be another boundary distanced from the automated guided vehicle 9a by 3 meters. Thus, when the ranging module 902a detects that the identification device 200 is disposed within the first following-range boundary 90211a, or out of the second following-range boundary 90212a, the identification device 200 would be judged to be out of the following range 9021a. Namely, the following range 9021a occupies the space between the first following-range boundary 90211a and the second following-range boundary 90212a.

The drive module 903a is configured to control moving of a main body of the automated guided vehicle 9a. In this embodiment, the drive module 903a is a kinematic mechanism of a general automated guided vehicle, including, for example, wheels, motors and turning assemblies. The main body of the automated guided vehicle 9a can be a casing or container of the automated guided vehicle 9a. The alert module 904a is configured to generate light or noise to alert the customer CN to follow. In this embodiment, the alert module 904a can be an LED matrix to provide different color light, different flicker frequencies or LED arrows to guide and alert the customer CN.

The vehicle navigation module 13, coupled signally with the operation interface 10, the shopping-site map database 12 and the automated guided vehicle 9a, includes a path planning unit 1301 and a path comparing unit 1302. The path planning unit 1301 evaluates the specified commodity-type signal to determine an assigned commodity display area corresponding to the assigned commodity type option as a target position from the plurality of commodity display areas 12011, and thereby to generate an automated navigation path GP1. In this embodiment, the commodity type chosen by the customer CN can be in correspondence to the commodity display area 12011. Thus, the automated navigation path GP1 is extended from the identification device 200 to the target commodity display area 12011 (i.e., the target position). Thereupon, the vehicle navigation module 13 can drive the automated guided vehicle 9a to move along the automated navigation path GP1 to arrive the commodity display area 12011 as the assigned commodity display area. The path comparing unit 1302 is used to determine whether or not the position of the identification device 200 (i.e., the position of the customer CN) follows the automated guided vehicle 9a to move along the automated navigation path GP1.

The positioning module 14, coupled signally with the vehicle navigation module 13, is configured to position the identification device 200, to evaluate the position variation of the identification device 200 to generate a customer moving path 200P, and to transmit the position of the identification device 200 and the customer moving path 200P to the vehicle navigation module 13. After the vehicle navigation module 13 receives the position of the identification device 200 and the customer moving path 200P, the path comparing unit 1302 would determine whether or not the customer CN follows the automated guided vehicle 9a to move, by comparing the customer moving path 200P and the automated navigation path GP1. While the path comparing unit 1302 detects that a deviation distance d between the identification device 200 and the automated navigation path GP1 is greater than a predetermined deviation distance, it is determined that the customer CN has already deviated from the automated navigation path GP1, and then the position of the identification device 200 and a navigation-path replanning signal (not shown in the figure) would be transmitted to the vehicle navigation module 13. Thereupon, the vehicle navigation module 13 can evaluate the position of the identification device 200 and the assigned commodity display area to reorganize another automated navigation path GP2. Practically, the positioning module 14 can position the identification device 200 by processing the signal intensity from the identification module 2001 with a received signal strength indicator (RSSI).

As described above, in this embodiment, since the vehicle navigation module 13 is to provide the automated navigation path GP1 by a minimum-path doctrine, thus the automated navigation path GP1 is extended from the position of the identification device 200, through the commodity display area 12011b, and finally to the commodity display area 12011a. Upon when the positioning module 14 detects that the customer CN has deviated from the automated navigation path GP1, if the customer CN is close to the commodity display area 12011c, then it will be judged that the customer CN may be attracted by some commodities displayed in the commodity display area 12011c. At this time, an automated navigation path GP2 will be reorganized to pass by the commodity display area 12011c and by having the commodity display area 12011a as the destination, such that the purchase desire of the customer CN can be satisfied.

Figure 11:
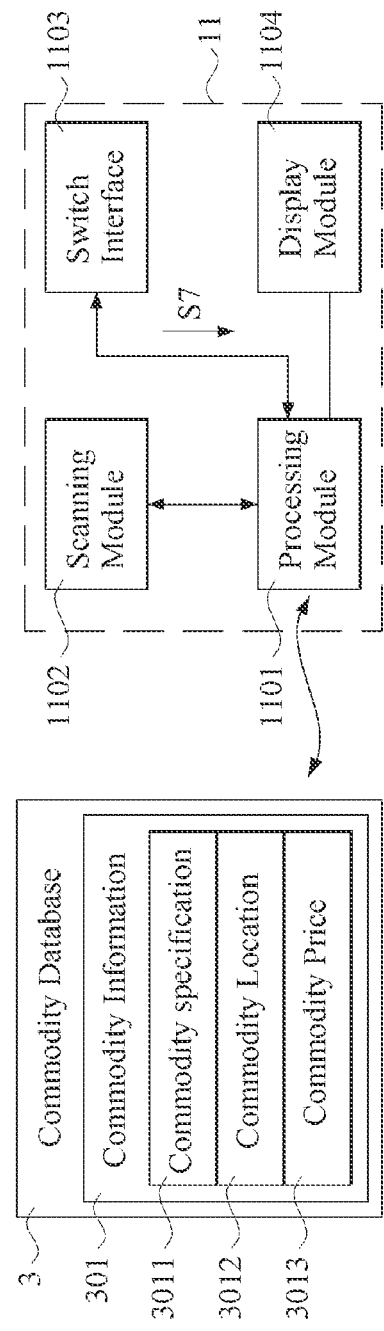
FIG. 11 is a schematic block view showing a connection between a valuation device and a commodity database in accordance with the present invention.
Figure 12:
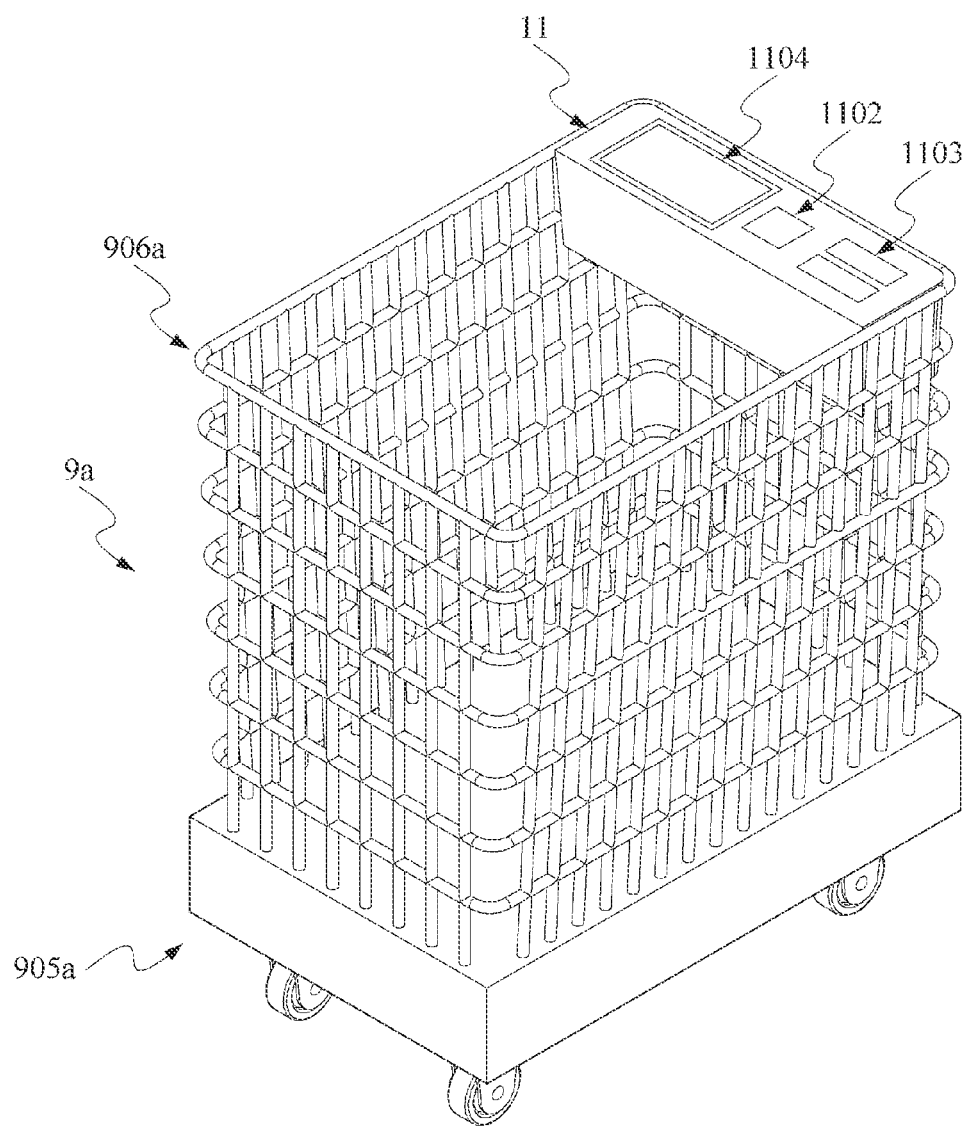
FIG. 12 is a schematic perspective view of an automated guided vehicle furnished with a valuation device in accordance with the present invention.

Refer further to FIG. 11 and FIG. 12; where FIG. 11 is a schematic block view showing a connection between a valuation device and a commodity database in accordance with the present invention, and FIG. 12 is a schematic perspective view of an automated guided vehicle furnished with a valuation device in accordance with the present invention. As shown in FIG. 11 and FIG. 12, the automated guided vehicle 9a of this embodiment further includes a vehicle body 905a and a commodity shelf 906a. The vehicle body 905a can be a vehicle casing, the drive module 903a is disposed inside the vehicle body 905a, and the commodity shelf 906a for containing commodities is fixed on the vehicle body 905a.

As described above, the valuation device 11, fixed on the commodity shelf 906a, includes a processing module 1101, a scanning module 1102, a switch interface 1103 and a display module 1104. The processing module 1101 is coupled signally with the commodity database 3. The scanning module 1102, connected electrically with the processing module 1101, is configured to scan the commodity code of the commodity to be purchased and to further obtain at least one scan information. Further, the processing module 1101 would evaluate the scan information to obtain at least one commodity price corresponding to the commodity to be purchased from all the commodity prices 3013 of the commodity database 3.

The switch interface 1103, connected electrically with the processing module 1101, includes an accumulated option (not shown in the figure) and a deleted option (not shown in the figure). The accumulated option can have a word "Gross total" to alert the user, while the deleted option can have another word "Rebate deduction" to alert the user. When the accumulated option is selected, the switch interface 1103 would issue a switch instruction S7 to the processing module 1101, so that, when the scanning module 1102 scans the commodity code of the commodity to be purchased, the processing module 1101 would add the commodity price of the commodity to be purchased from the commodity database 3 into a total price. On the other hand, when the deleted option is selected, the switch interface 1103 would issue a switch instruction S7 to the processing module 1101, so that, when the scanning module 1102 scans the commodity code of the commodity to be purchased, the processing module 1101 would deduct the commodity price of the commodity to be purchased from the commodity database 3 from the total price. The display module 1104, connected electrically with the processing module 1101, is configured to display the total price.

In summary, in comparison to the prior art in the shopping site to use simple-structured trolleys or baskets for carrying the purchased commodities, from which commodity overload or less-load at the load vehicle would be easy to happen and further to cause inconvenience to the customer in shopping, the automated guided vehicle control system and the associated automated guided vehicle dispatch method provided by this invention mainly utilize the historical shopping information acquisition module to retrieve the historical shopping information related to the customer, further to locate the instant predicted commodity to be purchased, and thereby to dispatch the suitable automated guided vehicle to the waiting area of the customer, such that the customer can be provided with the automated guided vehicle meeting the purchase habit of the customer.

In addition, since the present invention can evaluate the historical shopping information to provide the commodity type options for the customer to select, further to locate the commodity type to be purchased, and thereby to organize the automated navigation path for the automated guided vehicle to travel along to reach the assigned commodity display area, such that the customer can be well guided during the shopping, and the usage convenience of the load vehicle can be substantially enhanced. Though the present invention can evaluate the historical shopping information to dispatch the suitable automated guided vehicle to the customer, yet only the historical purchase records of the customer are collected for predicting the commodity to be purchased, and for dispatching a relevant load vehicle. However, the customer can still perform his or her different purchase plan. Thus, the present invention that utilizes the historical shopping information to provide the commodity type options for the customer to select can further meet the practical requirements of the customer in shopping.

While the present invention has been particularly shown and described with reference to a preferred embodiment, it will be understood by those skilled in the art that various changes in form and detail may be without departing from the spirit and scope of the present invention.

What is claimed is:

1. An automated guided vehicle control system, comprising:
a commodity database, storing a plurality of commodity information according to a plurality of commodity items sold in a shopping site, each of the plurality of commodity information including a commodity specification, each of the plurality of commodity items being corresponding to one of a plurality of commodity types;
a historical shopping information acquisition module, configured to retrieve historical shopping information in the shopping site related to a customer upon when the customer enters the shopping site, the historical shopping information recording at least one type of historical purchased commodities and at least one purchase date corresponding thereto among the plurality of commodity items purchased by the customer in the shopping site;
a purchase-item prediction module, coupled signally with the commodity database and the historical shopping information acquisition module, configured to evaluate the at least one type of historical purchased commodities and the at least one purchase date in the historical shopping information and further to predict at least one instant predicted commodity to be purchased among the plurality of commodity items, the purchase-item prediction module further comparing the at least one type of historical purchased commodities and the plurality of commodity items to generate at least one instant predicted purchase commodity type corresponding to at least one of the plurality of commodity types;
a plurality of automated guided vehicles, disposed in the shopping site, each of the plurality of automated guided vehicles having a navigation module;
an automated guided vehicle database, storing a plurality of vehicle specification information corresponding to the plurality of automated guided vehicles, each of the plurality of vehicle specification information including a maximum vehicle carrying capacity;
an automated guided vehicle dispatch demand assessment module, coupled signally with the purchase-item prediction module and the automated guided vehicle database, configured to compare the commodity specification corresponding to the at least one instant predicted commodity to be purchased and the maximum vehicle carrying capacity of each of the plurality of automated guided vehicles so as to locate one of the plurality of automated guided vehicles as a suitable automated guided vehicle to carry the at least one instant predicted commodity to be purchased and then to issue an automated guided vehicle dispatch demand signal to ask for dispatching the suitable automated guided vehicle;
an automated guided vehicle dispatch module, coupled signally with the automated guided vehicle dispatch demand assessment module, configured to receive and evaluate the automated guided vehicle dispatch demand signal and further to issue a dispatch signal to the suitable automated guided vehicle to move the suitable automated guided vehicle to a waiting area of the customer;
a shopping-site map database, storing map data corresponding to the shopping site, the map data being divided into a plurality of commodity display areas according to the plurality of commodity types;
an operation interface, coupled signally with the purchase-item prediction module, configured to evaluate the plurality of instant predicted purchase commodity types to provide a plurality of commodity type options for the customer to select, and to transmit a specified commodity-type signal upon when the customer determines an assigned commodity type option from the plurality of commodity type options; and a vehicle navigation module, coupled signally with the operation interface, the shopping-site map database and the plurality of automated guided vehicles, configured to evaluate the specified commodity-type signal to determine an assigned commodity display area corresponding to the assigned commodity type option from the plurality of commodity display areas, and thereby to generate an automated navigation path for the automated guided vehicle to travel therealong to reach the assigned commodity display area.

2. The automated guided vehicle control system of claim 1, wherein the purchase-item prediction module includes:

a purchase-cycle calculation unit, configured to calculate at least one purchase cycle corresponding to the at least one historical purchased commodity according to a plurality of the purchase dates; and a purchase-item prediction unit, connected electrically with the purchase-cycle calculation unit, having a date table, configured to evaluate the date table, the at least one purchase cycle and an instant purchase date that the customer enters the shopping site to determine the at least one instant predicted commodity to be purchased.

3. The automated guided vehicle control system of claim 1, wherein the maximum vehicle carrying capacity further includes a maximum vehicle carrying capacity, each of the plurality of commodity specifications further includes a commodity size, the automated guided vehicle dispatch demand assessment module compares the commodity size corresponding to the at least one instant predicted commodity to be purchased with the maximum vehicle carrying capacity of each of the plurality of automated guided vehicles to determine the suitable automated guided vehicle from the plurality of automated guided vehicles, and thereby to issue the automated guided vehicle dispatch demand signal.

4. The automated guided vehicle control system of claim 3, wherein the maximum vehicle carrying capacity further includes a maximum vehicle carrying weight, each of the plurality of commodity specifications further includes a commodity weight, the automated guided vehicle dispatch demand assessment module compares both the commodity size and the commodity weight corresponding to the at least one instant predicted commodity to be purchased with the maximum vehicle carrying capacity and the maximum vehicle carrying weight of each of the plurality of automated guided vehicles, so as to determine the suitable automated guided vehicle from the plurality of automated guided vehicles and further to issue the automated guided vehicle dispatch demand signal.

5. The automated guided vehicle control system of claim 1, further including:

a sensor module, disposed at an entrance of the shopping site, configured to detect an identification device carried by the customer and to generate a consumer entry signal corresponding to the customer; and a customer database, coupled signally with the historical shopping information acquisition module, including customer-identifying data corresponding to the historical shopping information of the customer, the historical shopping information acquisition module retrieving the historical shopping information from the customer database according to the consumer entry signal.

6. The automated guided vehicle control system of claim 1, wherein the automated guided vehicle is further provided with a following range, and the automated guided vehicle further evaluates a distance to the identification device so as to control a moving speed of the automated guided vehicle for controlling the distance to be smaller than the following range upon when the automated guided vehicle moves toward the assigned commodity display area along the automated navigation path.

7. The automated guided vehicle control system of claim 1, further including a positioning module coupled signally with the vehicle navigation module, wherein the positioning module is configured to position and determine if or not the identification device is deviated away from the automated navigation path upon when the automated guided vehicle moves toward the assigned commodity display area along the automated navigation path, to issue a navigation-path replanning signal to the vehicle navigation module while the identification device is deviated from the automated navigation path, and to have the vehicle navigation module to evaluate the position of the identification device and the assigned commodity display area to replan the automated navigation path.

8. The automated guided vehicle control system of claim 1, wherein each of the plurality of commodity information includes a commodity price, the automated guided vehicle control system further includes a valuation device, and the valuation device coupled signally with the commodity database includes:

a scanning module, configured to scan at least one commodity code of the commodity to be purchased to obtain at least one scan information;

a processing module, connected electrically with the scanning module, coupled signally with a control backstage, configured to evaluate the at least one scan information to obtain at least one commodity price corresponding to the commodity to be purchased from all the commodity prices of the plurality of commodity information, and to have the at least one commodity price to be added into a total price; and a display module, connected electrically with the processing module, configured to display the total price.

9. The automated guided vehicle control system of claim 8, wherein the valuation device further includes a switch interface, the switch interface connected electrically with the processing module includes an accumulated option and a deleted option, the processing module receives the at least one commodity price and adds the at least one commodity price into the total price upon when the accumulated option is selected, and the processing module receives the at least one commodity price and deducts the at least one commodity price from the total price upon when the deleted option is selected.

10. An automated guided vehicle control method, comprising the steps of:

(A) utilizing a sensor module to detect if or not an identification device enters a shopping site, and to generate a consumer entry signal to a historical shopping information acquisition module upon when the identification device is detected to enter the shopping site;

(B) according to the consumer entry signal, the historical shopping information acquisition module retrieving historical shopping information related to a customer in the shopping site, and then transmitting the historical shopping information to a purchase-item prediction module; wherein the historical shopping information records at least one type of historical purchased commodities among a plurality of commodity items the customer ever purchased in the shopping site and a plurality of purchase dates whenever the at least one type of historical purchased commodities is purchased;

(C) the purchase-item prediction module evaluating the at least one type of historical purchased commodities and the plurality of purchase dates in the historical shopping information to predict at least one instant predicted commodity to be purchased among the plurality of commodity items for the customer;

(D) utilizing an automated guided vehicle dispatch demand assessment module to compare a commodity specification of the at least one instant predicted commodity to be purchased with maximum vehicle carrying capacities corresponding to the plurality of automated guided vehicles, to determine a suitable automated guided vehicle for carrying the at least one instant predicted commodity to be purchased, and thereby to issue an automated guided vehicle dispatch demand signal to request the suitable automated guided vehicle;

(E) utilizing an automated guided vehicle dispatch module to receive and evaluate the automated guided vehicle dispatch demand signal to dispatch the suitable automated guided vehicle to a waiting area of the customer;

(F) according to the historical shopping information, providing a plurality of preferable options of commodities for the customer to determine one target commodity therefrom;

(G) according to the target commodity, planning an automated navigation path; and (H) controlling the suitable automated guided vehicle to move along the automated navigation path to reach one of a plurality of commodity display areas corresponding to the target commodity.

\* \* \* \* \*